US011638093B2

(12) United States Patent
Dayan et al.

(10) Patent No.: US 11,638,093 B2
(45) Date of Patent: Apr. 25, 2023

(54) THERMAL LIMITER FOR A PANEL SPEAKER

(71) Applicant: Waves Audio Ltd., Tel Aviv (IL)

(72) Inventors: Barak Ben Dayan, Givatayim (IL); Meir Shaashua, Tel Aviv (IL)

(73) Assignee: Waves Audio Ltd., Tel Aviv (IL)

( * ) Notice: Subject to any disclaimer, the term of this patent is extended or adjusted under 35 U.S.C. 154(b) by 0 days.

(21) Appl. No.: 17/361,348

(22) Filed: Jun. 29, 2021

(65) Prior Publication Data

US 2021/0409865 A1 Dec. 30, 2021

Related U.S. Application Data

(60) Provisional application No. 63/045,854, filed on Jun. 30, 2020.

(51) Int. Cl.
*H04R 3/00* (2006.01)
*G01K 1/14* (2021.01)
*G01K 3/00* (2006.01)

(52) U.S. Cl.
CPC .............. *H04R 3/007* (2013.01); *G01K 1/14* (2013.01); *G01K 3/005* (2013.01)

(58) Field of Classification Search
None
See application file for complete search history.

(56) References Cited

U.S. PATENT DOCUMENTS 9,729,986 B2 8/2017 Crawley
10,271,151 B2 4/2019 Polleros

2006/0099996 A1 5/2006 Kanai
2019/0268681 A1 8/2019 Masuda et al.
2020/0344547 A1* 10/2020 Lee .......................... H04R 7/26

FOREIGN PATENT DOCUMENTS

WO WO-2021183139 A1 * 9/2021

OTHER PUBLICATIONS

Bai, Mingsian & Huang, Talung. (2001). Development of panel loudspeaker system: Design, evaluation and enhancement. The Journal of the Acoustical Society of America. 109. 2751-61. 10.1121/1.1371544.

* cited by examiner

*Primary Examiner* — Kenny H Truong
(74) *Attorney, Agent, or Firm* — Dr. Hanan Farber Patent Agent Ltd

(57) ABSTRACT

Controlling temperature of a surface of the electronic device. The electronic device includes: a speaker, an adaptive control circuit configured to receive an audio input signal responsive to an audio input power to the speaker and a temperature sensor configured to sense a temperature internal to the electronic device. A temperature signal responsive to the sensed temperature is input to the adaptive control circuit. Responsive to the audio input signal and the temperature signal a power control signal is computed by the adaptive control circuit so that a temperature of the surface of the electronic device at a later time approaches a previously determined target temperature. An audio limiter is configured to limit the audio input power to the speaker responsive to the power control signal.

19 Claims, 3 Drawing Sheets

THERMAL LIMITER FOR A PANEL SPEAKER

BACKGROUND

1. Technical Field

Aspects of the present invention relates to thermal control in an electronic device including a loudspeaker.

2. Description of Related Art

Conventional electrodynamic audio loudspeakers produce sound by inducing oscillatory motion of a magnet or coil attached to a diaphragm which is usually cone shaped. Flat panel audio loudspeakers include planar magnetic loudspeakers, electrostatic flat panel speakers and distributed mode loudspeakers. Distributed mode loudspeakers operate by inducing uniformly distributed vibration modes in a panel with an electro-acoustic actuator.

An electronic device, such as a smartphone may incorporate a flat panel audio loudspeaker into a display screen with an actuator that applies force to the display screen and creates vibrations of the display screen that couples to surrounding air to generate sound waves. A representative example of a panel speaker integrated with a display is disclosed in US patent publication US2019/0268681.

Efficiency of audio loudspeakers, the ratio of acoustic power produced to electrical power input is very low and most of the audio electrical power input to a loudspeaker is converted to heat which tends to heat up the electronic device.

BRIEF SUMMARY

Various electronic devices, methods and adaptive control circuits are described herein for controlling temperature of a surface of the electronic device. The electronic device includes: a speaker, an adaptive control circuit configured to receive an audio input signal responsive to an audio input power to the speaker and a temperature sensor configured to sense a temperature internal to the electronic device. A temperature signal responsive to the sensed temperature is input to the adaptive control circuit. Responsive to the audio input signal and the temperature signal a power control signal is computed by the adaptive control circuit so that a temperature of the surface of the electronic device at a later time approaches a previously determined target temperature. An audio limiter is configured to limit the audio input power to the speaker responsive to the power control signal. The electronic device may include a display configured at least in part as a diaphragm of the speaker. The display may include at least a portion of the surface of the electronic device. A portion of the audio input to the speaker may be dissipated as heat and a portion of the heat may propagate to and heat the surface of the electronic device. The audio limiter may be configured to set the audio input power so that said temperature at a later time approaches a temperature less than or equal to the previously determined target temperature when: (i) a temperature of the surface of the electronic device is currently less than the previously determined target temperature; or (ii) a temperature of the surface of the electronic device is currently greater than the target temperature. When a temperature of the surface of the electronic device is currently greater than the target temperature, the audio input power to the speaker may be maintained at a level, e.g. constant, so that the surface of the electronic device at a later time approaches the target temperature by heat dissipation. The adaptive control circuit may include a thermal model dynamics module configured to input a value proportional to the audio input power to the speaker and predict therefrom a temperature of the surface of the electronic device after a sampling interval of sensing the temperature. The adaptive control circuit may include a thermal protection module configured to compute the power control signal responsive to the predicted temperature of the surface of the electronic device. The adaptive control circuit may include an ambient temperature estimation module configured to estimate ambient temperature of the ambient of the electronic device. Based on a discrepancy between a sensed temperature and a predicted temperature, a value of ambient temperature may be updated during one or more next sampling intervals.

The power control signal may be computed responsive to a transient time parameter which controls a rate of change of the temperature of the surface of the electronic device.

A second control circuit may be configured to output a second control signal for controlling the audio input power to the speaker. The audio limiter may be configured to limit the audio input power according to a third control signal responsive to both the power control signal and the second control signal.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1:
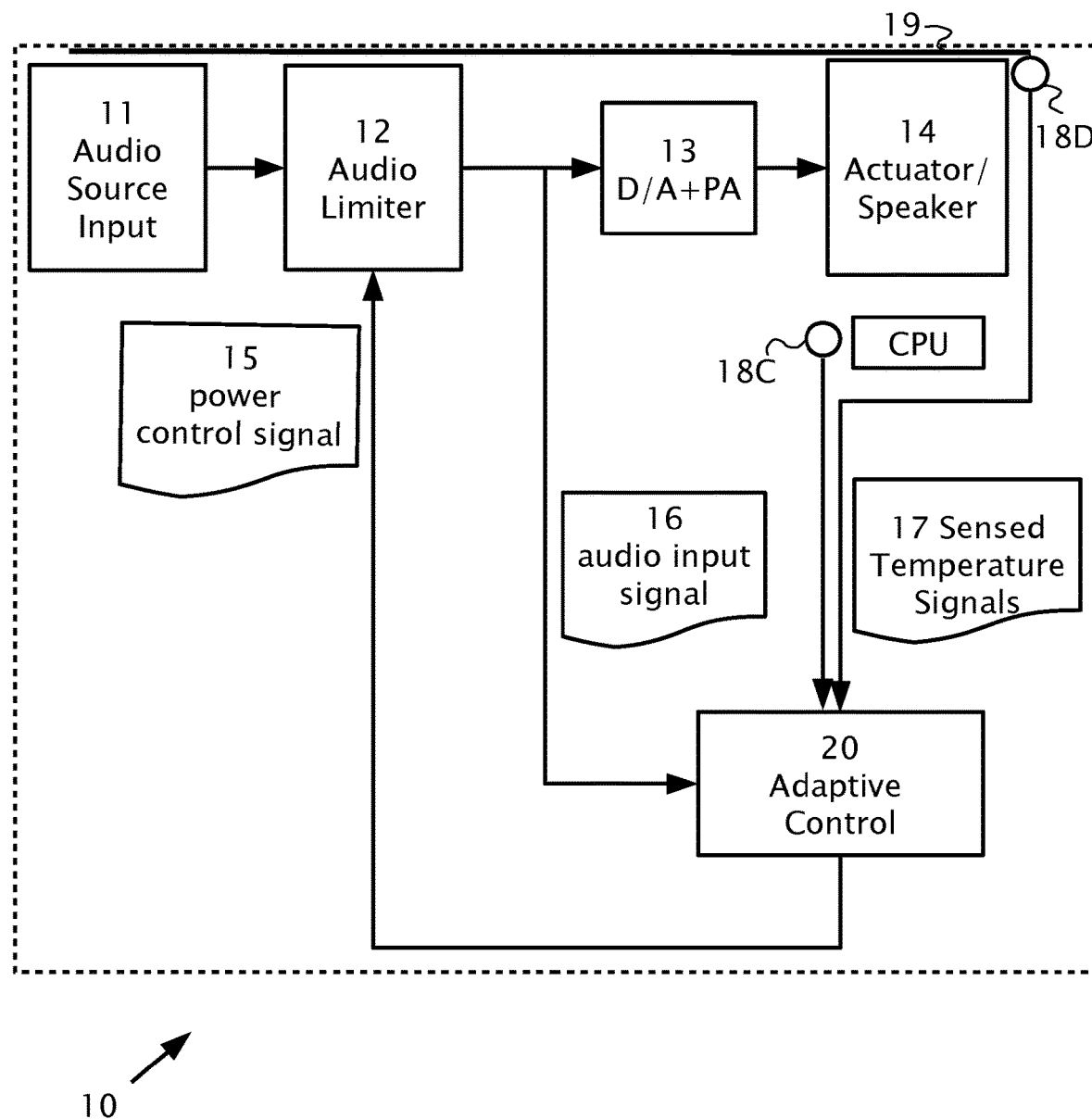
FIG. 1 is a simplified schematic block diagram which illustrates features of the present invention in an electronic device.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

By way of introduction, various embodiments of the present invention are directed to adaptive control which controls temperature of a surface of an electronic device including a loudspeaker. Audio input to the loudspeaker may be limited so that the surface temperature does not exceed or approaches a threshold temperature. The adaptive control, while controlling surface temperature, is also configured to minimize variations in input audio power in order to improve the listening experience. Features of the present invention may be configured for a panel speaker integrated with a surface, e.g. the top surface or back surface, of the electronic device and/or for a display screen in which a speaker is integrated together with the display screen as disclosed in US patent publication US2019/0268681, by way of example.

Referring now to the drawings, reference is now made to FIG. 1, which illustrates features of the present invention in an electronic device 10. An audio signal input 11 from an audio source, e.g. media player, voice call, may be routed as a digital audio stream through an audio limiter 12, through an analog block 13 including a digital-to-analog converter D/A and a power amplifier. The power amplifier of block 13 outputs audio power to a loudspeaker 14 which plays responsively to the audio power. Loudspeaker 14 may be an electrodynamic loudspeaker including a voice-coil actuator or a distributed mode loudspeaker including an electro-acoustic actuator, by way of example. Loudspeaker 14 receives power from the power amplifier, some of which is converted to acoustic power while the remainder may be converted to thermal power which may heat up actuator 14 mass. Audio limiter 12 is configured to limit the audio signal according to an input power control signal 15. Power control signal 15 may include a threshold audio power which may be root-mean-squared power or peak power, by way of example. An adaptive control block 20 determines and outputs power control signal 15 for an upcoming sample of audio source input 11. Adaptive control block 20 inputs a digital audio input signal 16 responsive or proportional to audio limiter 12 output. Adaptive control block 20 also inputs feedback signals such as sensed temperature signals 17 from temperature sensors, e.g. thermistors, integrated into electronic device 10. A temperature sensor 18C is shown which may measure processor (CPU) temperature and a temperature sensor 18D may be used to measure temperature internally of a surface 19, e.g. display screen, of which the external temperature of surface 19 is being controlled.

In electronic device 10, heat energy generated in actuator/speaker 14 propagates within electronic device 10. Some of the heat energy generated may reach surface 19 by thermal conduction. Processor (CPU) and other components in electronic device 10 may similarly generate heat. Surface 19 may heat up from internally generated heat and propagated in electronic device 10. Surface 19 may cool down by delivering heat to outside air by conduction, convection and/or radiation and depends generally on the ambient temperature and the temperature of surface 19.

Figure 2:
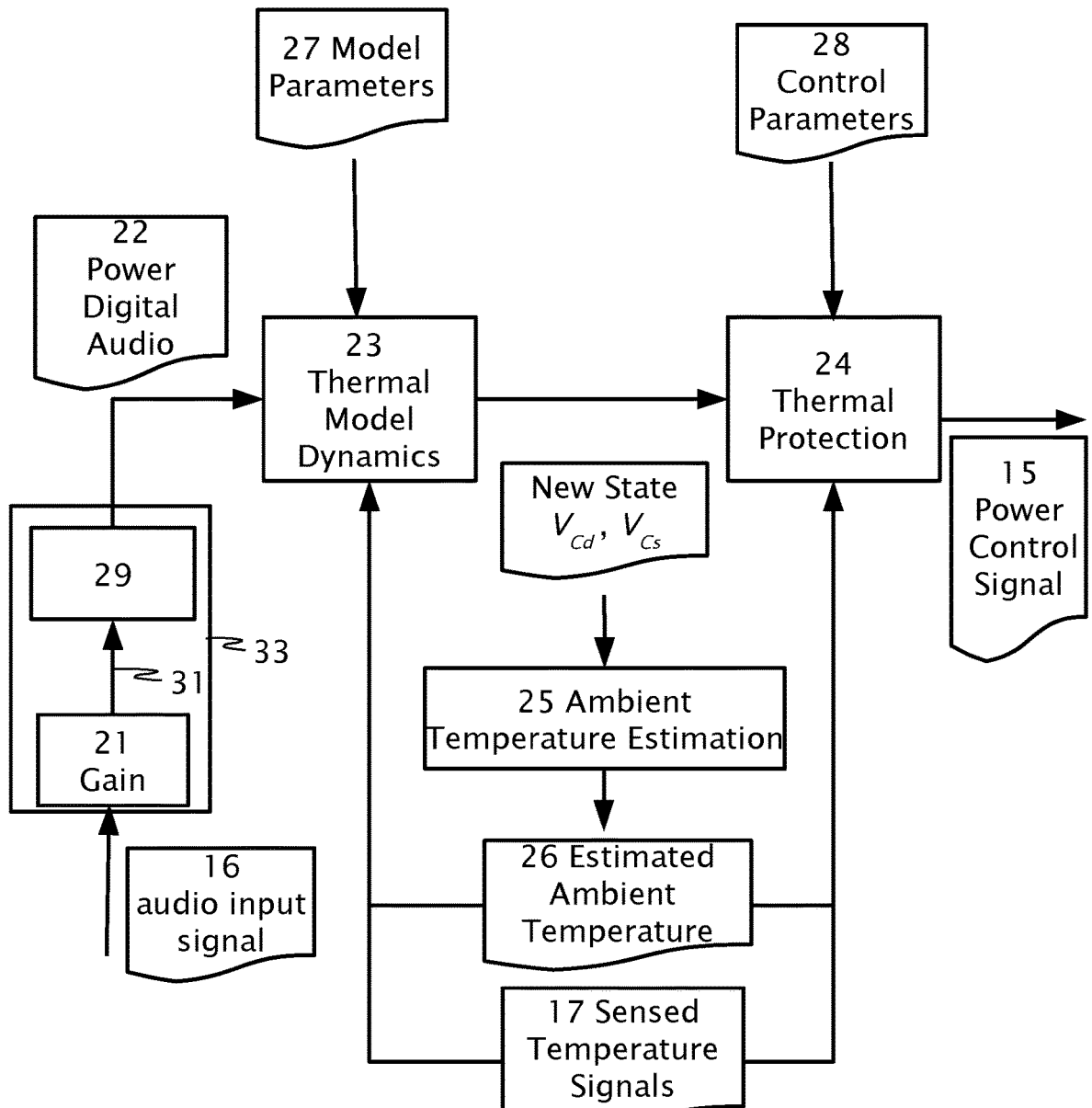
FIG. 2 is a simplified flow diagram of a control method functional in the electronic device, according to features of the present invention.

Reference is now also made to FIG. 2, which illustrates a flow diagram of a control method functional in adaptive control block 20, according to features of the present invention. Digital audio input signal 16 may feed a block 33 which may simulate passage of audio input signal 16 through digital-to-analog and power-amplifier (block 13, FIG. 1) which results in a simulated analog signal 31 at the speaker input. Gain in block 21 may be set by tunable parameters determined by a model parameter fitting process described hereinafter. Block 29 receives simulated audio signal 31 and calculates a value of digital audio input power 22 simulating actual power delivered to speaker 14. Calculation of power 22 may depend of phase/frequency content of audio input signal 16, for example. Value 22 of digital audio input power is input into a thermal model dynamics block 23. Thermal model dynamics block 23 simulates heat propagation within electronic device 10 as approximated by a parameterized thermal model. For a given current state of the surface 19 temperature $V_{Cd}$ and speaker 14 temperature $V_{Cs}$, the next state ($V_{Cd}$, $V_{Cs}$) is calculated using current values of measured processor (CPU) temperature $V_p$, an estimated ambient air temperature $V_a$ and the input power digital audio 22 that represents the amount of power currently delivered to speaker 14.

A thermal protection block 24 may use the calculated state ($V_{Cd}$, $V_{Cs}$) and the latest values for measured processor (CPU) temperature $V_p$ and estimated ambient temperature $V_a$ to compute a maximum allowed audio power that may be currently input to speaker 14, such that a specified target temperature, e.g. previously determined, will not be later exceeded at surface 19. A computed maximum allowed audio power may be used to determine power control signal 15 which may include a threshold for audio limiter 12.

Otherwise, if the temperature of surface 19 is already greater than the specified target temperature, then power control signal 15 may maintain audio gain at a level, e.g. constant level, in audio limiter 12 until surface 19 temperature converges to or below the specified target temperature due to heat dissipation. Thermal protection block 24 may input and use control parameters 28 including: the specified target temperature, a crest factor parameter which adjusts how quickly the temperature of surface 19 approaches the specified target temperature and a maximum attenuation parameter which optionally specifies a maximum attenuation allowed in audio limiter 12.

Updated sensed temperature signals 17 may be received by adaptive control block 20 with new readings of internal surface 19 temperature $V_{Cd}$ and processor (CPU) temperature $V_p$. Surface 19 temperature $V_{Cd}$ may be updated with a new value. If there is a discrepancy between the predicted state and the updated value, the discrepancy may be used in block to update an estimate 26 for ambient temperature $V_a$. The updated values of ambient temperature $V_a$ and current sensed temperature signals 17 are used by both thermal model dynamics block 23 and the thermal protection block 24 for a subsequent iteration.

A computed maximum, e.g. in power units, may serve as a threshold (power control signal 15) for audio limiter 12 before the next iteration of audio input power is input to speaker 14. Thus, when speaker 14 plays audio in response to the audio input power, the heat which is generated in speaker 14 and propagates through device 10 does not result in surface 19 being heated to be greater than the specified target temperature.

According to an embodiment of the present invention, computed maximum power may be output as power control signal 15 which may be input to audio limiter 12. Audio limiter 12 may calculate a power that the next sample of digital audio signal from audio source input 11 may deliver to speaker 14 without limiting power. Using the calculated power and maximum allowed power (power control signal 15) the amount of limiting provided in audio limiter 12 may be determined. Audio limiter 12 may include functional blocks similar to gain block 21 and power calculation block 29 in adaptive control block 20.

Thermal Model Dynamics (Block 23)

Figure 3:
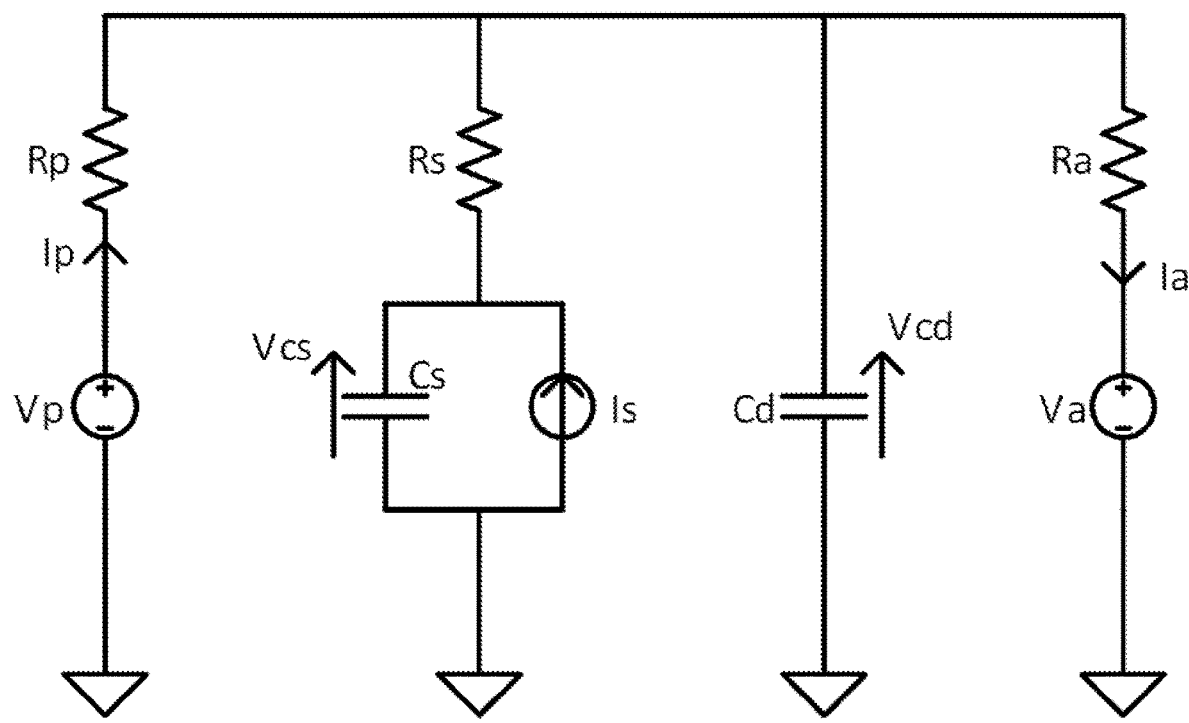
FIG. 3 illustrates an equivalent electrical circuit for a thermal model of the electronic device, according to features of the present invention.

Reference is now made to FIG. 3 which illustrates an equivalent electrical circuit for a thermal model, according to features of the present invention for electronic device 10, where:

$V_p$ is a measured temperature (in ° C.) mainly of the processor (CPU).

$V_a$ is an estimated temperature (in ° C.) of the ambient air or room-temperature $V_{Cs}$ is an estimated temperature (in ° C.) of speaker actuator 14 which may be but not necessarily the same as the voice-coil temperature.

$V_{Cd}$ is the measured temperature (in ° C.) internally of surface 19 which if surface 19 is part of a display screen, measured temperature $V_{Cd}$ may represent the internal screen temperature.

$I_s$ is the thermal power delivered to speaker 14.

$I_a$ is the thermal power of the heat that dissipates from the surface 19, e.g. display screen, outwards to ambient air.

$I_p$ is the thermal power that originates from processor (CPU) along with other components in the vicinity of the CPU in electronic device 10.

Model Parameters 27:

$C_d$ is a capacitance representing thermal capacity of surface 19, e.g. display screen, i.e. how much hotter (in degrees Celsius) does surface 19 become per unit of thermal energy delivered to surface 19.

$C_s$ is a capacitance representing thermal capacity of speaker/actuator 14.

$R_s$ is a resistance representing thermal resistance between speaker 14 and surface 19, e.g. display screen, i.e. how readily heat energy flows between speaker 14 and surface 19 for a given temperature difference between them.

$R_a$ is a resistance representing thermal resistance between surface 19, e.g. display screen and ambient.

$R_p$ is a resistance representing thermal resistance between the processor (CPU along with perhaps other components) and surface 19, e.g. display screen.

The state $(V_{Cd}, V_{Cs})$ of electronic device 10 at a given time is given by the voltage (temperature difference) across the capacitors $C_d$ and $C_s$. The electronic device dynamics is dependent on an initial state of electronic device 10 and the (external) input signals $I_s$, $V_p$ and $V_a$:

$$V_{C_d}^{[(n+1)T]} = \left[1 - \frac{T}{C_d}\left(\frac{1}{R_s} + \frac{1}{R_a} + \frac{1}{R_p}\right)\right]V_{C_d}^{[nT]} +$$

$$\frac{T}{R_s C_d} V_{C_s}^{[nT]} + \frac{T}{R_a C_d} V_a^{[nT]} + \frac{T}{R_p C_d} V_p^{[nT]}$$

$$V_{C_s}^{[(n+1)T]} = \frac{T}{R_s C_s} V_{C_d}^{[nT]} + \left[1 - \frac{T}{R_s C_s}\right]V_{C_s}^{[nT]} + \frac{T}{C_s} I_s^{[nT]}$$

where:

T is the sampling interval in seconds (reciprocal of the audio sample rate in Hertz).

n is the current sample index.

(n+1) is the index of the next sample.

Using the above equations, given $V_a^{[nT]}$, $V_p^{[nT]}$ and $I_s^{[nT]}$ for values of sample index n, temperature values $V_{Cd}^{[(n+1)T]}$ and $V_{Cs}^{[(n+1)T]}$ of surface 19 and actuator 14 respectively temperatures may be deduced iteratively along time given an initial state.

Finding Model Parameters 27:

Model parameters 27 $C_d$, $C_s$, $R_s$, $R_a$, $R_p$ may be found monolithically by fitting a real-time model prediction to measured temperatures of electronic device 10. The measured temperatures over time contain information which may be sufficient for adequately fitting model parameters 27 to the measured temperatures. The model may include simplifying assumptions including:

The components are assumed to be lumped i.e. pointwise components with a single temperature that propagate through electronic device 10 in zero time.

The thermal connections are assumed to be lumped (i.e. all heat transfer occurs in zero time, through one propagation path)

There are no additional thermal components/thermal relays in device 10.

No other heat is produced in device 10 (for example, display screen self-heating)

Ambient temperature is assumed to change slowly with time

The recorded values have systematic and random error up to a finite precision.

If a discrepancy develops between the model prediction and the measured temperatures of the behavior of device 10, the discrepancy may be corrected in the next update from sensed temperature signals 17, since the new state $(V_{Cd}, V_{Cs})$ is corrected using sensed temperature signals 17. Thus, errors may occur for short times, but errors are not expected to accumulate over time. An upper bound on the errors of the model prediction may be predicted based on the fit quality of the model and sampling interval T of sensed temperature signals 17.

Thermal Protection Block 24

Thermal protection block 24 may calculate, based on current thermal model state $(V_{Cd}, V_{Cs})$ and sensed temperatures, a power that may be input to speaker 14 and output accordingly power control signal 15. If the current reference temperature, (e.g. the external temperature of surface 19 or an internal temperature e.g. $V_{CD}$) is below the specified target temperature, then device 10 may be further heated before the reference temperature reaches the target temperature and audio power may continue to be delivered to speaker 14. However, if the reference temperature is at or above the target temperature with a audio power input. e.g. constant level to speaker 14, surface 19 of electronic device 11 may still reach a steady state reference temperature at the target temperature and the audio is not necessarily muted. However, if the steady-state value for the current conditions will remain above the target temperature even when no audio is input to speaker 14, than the audio limiter 11 may fully mute the audio input to speaker 14.

The considerations specified above may be achieved using two limiting mechanisms:

(1) a steady-state power limiter, and (2) a transient power limiter:

The steady state limiter may determine a maximum allowed audio power such that assuming the current audio power input to speaker 14 stays constant and the ambient temperature and CPU temperature do not change within a previously determined threshold, the reference temperature will converge to a target temperature threshold $V^{max}$.

The transient limiter may allow excess power to speaker 14, for a time interval of τ seconds, thereafter the reference temperature approaches and remains at the threshold value $V^{max}$ since the excess power is zero. The total allowed audio power is the steady state power plus the excess power for transients.

Calculating the Maximum Allowed Power

Assuming the reference temperature $V^{ref}$, the current temperature of surface 19, is a linear function of the thermal model states:

$$V^{ref} = \alpha V_{Cd} + \beta V_{Cs} + \gamma V_a + \delta V_p \tag{1}$$

where:

$V_{Cd}$ is the temperature of surface 19, $V_{Cs}$ is the temperature of speaker 14, $V_a$ is the air or ambient (room) temperature, $V_p$ is the processor (CPU) temperature, α, β, γ, δ are tunable constants.

Steady-state and transient limiters may drive the states ($V_{Cd}$, $V_{Cs}$) such that on steady-state, the linear combination of the states will reach target threshold $V^{max}$ as defined in equation (1). Since current reference temperature is dependent both on $V_{Cd}$ and $V_{Cs}$, maximization is performed on both values simultaneously. Specifically, the maximal values take place in steady state:

$$V^{max} = \alpha \bar{V}_{Cd} + \beta \bar{V}_{Cs} + \gamma \bar{V}_a + \delta \bar{V}_p \qquad (2)$$

Where $\bar{\nabla}$ denotes steady-state values.
The circuit constraints on steady state are:

$$\bar{V}_{Cd} = \bar{V}_{Cs} - \bar{I}_s^{max} \cdot R_s \qquad (3)$$

$$\frac{V_p - \bar{V}_{Cd}}{R_p} + \bar{I}_s^{max} = \frac{\bar{V}_{Cd} - V_a}{R_a} \qquad (4)$$

And so the problem at hand is as follows:
Given:
$R_p$, $R_s$, $R_a$, $\alpha$, $\beta$, $\gamma$, $\delta$, $V_a$, $V_p$, $V^{max}$
Find:
$\bar{V}_{Cd}$, $\bar{V}_{Cs}$, $\bar{I}_s^{max}$
Using eq. (2), (3) and (4).
Solution:

$$R_{a\|p} = R_a \| R_p \qquad (5)$$

$$\rho = 1 + \frac{R_s}{R_{a\|p}}$$

$$g = \frac{1}{\alpha + \beta \rho}$$

$$\bar{V}_{Cd} = gV^{max} + g\left(\beta \frac{R_s}{R_a} - \gamma\right)V_a + g\left(\beta \frac{R_s}{R_p} - \delta\right)V_p$$

$$\bar{V}_{Cs} = \rho V^{max} - \left(g\alpha \frac{R_s}{R_a} + \rho\gamma\right)V_a - \left(g\alpha \frac{R_s}{R_p} + \rho\delta\right)V_p$$

$$\bar{I}_s^{max} = g \frac{1}{R_{a\|p}} V^{max} -$$

$$g\left((\alpha + \beta)\frac{1}{R_a} + \gamma\frac{1}{R_{a\|p}}\right)V_a - g\left((\alpha + \beta)\frac{1}{R_p} + \delta\frac{1}{R_{a\|p}}\right)V_p$$

Where:
$\bar{I}_s^{max}$ is the maximum allowed power for steady state.
$\bar{V}_{Cd}$ is the internal surface 19 temperature at steady state (assuming constant audio power, room temperature $V_a$ and CPU temperature $V_p$ for infinite time).
$\bar{V}_{Cs}$ is speaker 14 temperature at steady state.

In a special case, of a temperature sensor 18D situated on a point of internal surface 19, the temperature of which is being controlled, the linear combination of equation (1) is simplified with weight equals one on a point of internal surface 19, and weight equals zero otherwise. Thus, in this special case:

$$\alpha = 1, \beta = \gamma = \delta = 0$$

and reference temperature $V^{ref}$ is:

$$V^{ref} = V_{Cd}$$

The target temperature $V^{max}$ being controlled is the internal screen temperature $V_{Cd}^{max}$:

$$V^{max} = V_{Cd}^{max}$$

And so the steady-state solution becomes:

$$\bar{V}_{Cd} = V^{max} \qquad (6)$$

$$\bar{I}_s^{max} = \frac{V^{max} - V_a}{R_a} + \frac{V^{max} - V_p}{R_p}$$

$$\bar{V}_{Cs} = V^{max} + \bar{I}_s^{max} \cdot R_s$$

For the above special case, the excess power for transients $\Delta \tilde{I}_s^{max}$ is then calculated as follows:

$$\Delta V_{Cs} = V_{Cs} - \bar{V}_{Cs} \qquad (7)$$

$$\Delta V_{Cd} = V_{Cd} - \bar{V}_{Cd}$$

$$\Delta \tilde{I}_s^{max} = \left(\frac{C_d}{\tau} - \frac{1}{R_a} - \frac{1}{R_p}\right)\Delta V_{Cd} + \left(\frac{C_s}{\tau} - \frac{1}{R_a + R_s} - \frac{1}{R_p + R_s}\right)\Delta V_{Cs}$$

Where:
$V_{Cs}$ is the current speaker temperature.
$V_{Cd}$ is the current internal display temperature.
$\tau$ is the time assumed for constant audio level until the threshold temperature is reached, also called transient time or Crest Factor parameter.
$\Delta \tilde{I}_s^{max}$ is the excess power allowed (above the steady-state power) during a time interval.

Then, the total maximum allowed power $I_s^{max}$ from thermal protection block 24 is:

$$I_s^{max} = \bar{I}_s^{max} + \Delta \tilde{I}_s^{max} \qquad (8)$$

Equations (7) and (8) model the special case in which temperature sensor 18D is situated on a point of internal surface 19, the temperature of which is being controlled.

Adaptive control circuit 20 computes transient allowed power $\Delta \tilde{I}_s^{max}$ in excess of steady state, which is an estimated heat energy budget, from current temperature state ($V_{Cd}$, $V_{Cs}$) to reach the target temperature $V^{max}$. The rate of approaching the target temperature is parameterized by the transient time $\tau$. Thus, there is a degree of freedom whether to use the heat energy budget rapidly, e.g. over one sampling time interval or more slowly, e.g. over many time intervals. Since the duration of the audio input is not generally known in advance, assumptions may be made that the current thermal power remains nearly constant during transient time $\tau$ and also the heating rate (taking into account heat dissipation to the environment) remains nearly constant during transient time $\tau$. If information is known regarding audio source input 11, then this information may be used to set the transient time parameter. Otherwise, transient time $\tau$ may be set iteratively based on learning from prior use cases.

Ambient (Room) Temperature $V_a$ Update

In the above equations, it is assumed that the ambient (room) temperature $V_a$ is known. However, since there may be no direct measurement of ambient temperature $V_a$ an estimation of the ambient temperature $V_a$ is suggested.

The principle behind the estimation of ambient temperature $V_a$ includes:
During normal operation of electronic device 10, thermal dynamics may be calculated for multiple audio samples using thermal model dynamics block 23 and new estimations for speaker temperature $V_{Cs}$ and internal display temperature $V_{Cd}$ result for every audio sample.
At some intervals (whether time intervals or temperature intervals), there are new measurement readings of the internal display temperature $V_{Cd}$ and the CPU temperature $V_p$.

When such a measurement is read, the discrepancy between the predicted $V_{Cd}$ and the measured $V_{Cd}$ is calculated:

$$e_{V_{Cd}} = \Delta V_{Cd} = V^*_{Cd} - V_{Cd}$$

where $e_{V_{Cd}}$ is the error (discrepancy), $V^*_{Cd}$ is the new measured temperature, and $V_{Cd}$ is the current predicted state by the thermal model.

An assumption is made, that discrepancy $e_{V_{Cd}}$ is solely caused by an incorrect value of $V_a$ the ambient temperature. Although in reality discrepancy $e_{V_{Cd}}$ may also be caused from the assumed thermal model being incomplete or inadequate, those errors are assumed to be much less then the estimation error in ambient temperature $V_a$ value.

Although there may be other heat sources and sinks which are not measured or known, these unknown heat sources and sinks are incorporated into the ambient temperature parameter $V_a$ to represent these unknowns in a single parameter.

Based on the previous assumption, an update of ambient temperature $V_a$ may be calculated and if the estimation of surface 19 temperature $V_{Cd}$ is biased by a value $\Delta V_{Cd}$, then the update corrects for the bias by increasing $V_a$ with the same amount:

$$V_a^{next} = V_a^{current} + \Delta V_{Cd}$$

Speaker 14 temperature $V_{Cs}$ may be similarly updated, since also speaker 14 temperature $V_{Cs}$ is also predicted using an approximate estimate of ambient temperature:

$$V_{Cs}^{next} = V_{Cs}^{current} + \Delta V_{Cd}$$

Surface 19 temperature $V_{Cd}$ may then be updated with the measured value. In this way, errors in the fit of the thermal model are limited only to the time or temperature interval between measurement readings, and do not accumulate over time.

Ambient temperature $V_a$ estimation converges to a realistic value at the start of an audio stream. Ambient temperature $V_a$ is iteratively tracked which is assumed to vary slowly with time, such that the value of $V_a$ that was updated in one time frame, serves as the value for the model dynamics prediction (block 23) of the next interval until the next sensed temperature signals 17. After several iterations, the initial assumed value of ambient temperature $V_a$ at the start of an audio stream does not change the dynamic model behavior, as ambient temperature $V_a$ converges to a realistic value during a time period, which depends on the temperature measurement 17 sampling rate.

Integrating with Other Dynamic Range Control Methods

In a practical electronic device, e.g. smartphone, that may include a panel speaker, other audio processing methods may be available or required which are also directed to control audio dynamic range and/or audio level, in addition to methods disclosed hereinabove. By way of example, such audio processing may include: limiting speaker 14 excursion and/or protect the voice coil from over heating; audio peak limiting by reducing the audio peak-to-root mean squared (RMS) ratio while maximizing RMS output level; compression to reduce audio dynamic range; and leveling to reduce differences between different contents. It is well known that parallel control methods may result in undesirable oscillations such as audible pumping if the multiple control methods interact. Known methods directed to avoid undesirable interactions between multiple control methods include partitioning different frequency/time constants to the different control algorithms.

Alternatively, the teachings of US patent publication U.S. Pat. No. 6,535,846 may be applied. Specifically, U.S. Pat. No. 6,535,846 discloses an approach of using parallel sidechains. Several analysis algorithms may analyze the audio signal in parallel. Each algorithm computes a desired gain for the audio, a minimum or other compromise between the computed gains may applied.

The term "electronic device" as used herein includes but not limited to fixed and/or mobile computing devices such as portable telephones, smartphones, tablet computers, and laptop computers.

The term "surface" as used herein of an electronic device is an outer surface generally in contact with ambient or air and/or in contact with a supporting surface.

The terms "speaker" and "loudspeaker" are used herein interchangeably and refers to a transducer from electrical to acoustic energy.

The terms "display" and "display screen" are used herein interchangeably and refers to an electronic display attached to a processor of an electronic device for visually presenting text and/or graphics to a user of the electronic device.

The term "approach" as used herein in the context of a temperature approaching a target temperature means getting closer to the target temperature given initial and ongoing temperature conditions such as ambient temperature and/or processor temperature. The controlled temperature may approach the target temperature from below or from above.

The term "power control" in the context of a "power control signal" may refer to a gain control, gain change within a specific audio frequency band or other control configured to increase/reduce audio power to the speaker.

The term "ambient" as used herein in the context of an ambient temperature parameter is a temperature parameter for which there may not be a direct measurement. Ambient temperature may be an actual ambient or room temperature or a temperature parameter which depends on actual ambient temperature and other temperatures in the electronic device which are not known directly for which there is no direct measurement.

The term "interval" as used herein refers to a sampling or iteration interval based on time, temperature or combinations thereof.

The indefinite articles "a", "an" is used herein, such as "a speaker", "a temperature" have the meaning of "one or more" that is "one or more speakers" or "one or more temperatures".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The claimed invention is:

1. A method performable in an electronic device including a speaker, the method comprising:

inputting an audio input signal to an adaptive control circuit, wherein the audio input signal is responsive to an audio input power to the speaker;

sensing a temperature internal to the electronic device;

inputting a temperature signal responsive to the sensed temperature to the adaptive control circuit;

responsive to the audio input signal and the temperature signal, computing a power control signal so that a temperature of a surface of the electronic device at a later time approaches a previously determined target temperature;

limiting the audio input power to the speaker responsive to the power control signal; and responsive to the audio input power to the speaker, predicting a temperature of the surface of the electronic device after a sampling interval of said sensing the temperature.

2. The method of claim 1, wherein the electronic device further includes a display, wherein the display is configured at least in part as a diaphragm of the speaker, wherein the display includes at least a portion of the surface of the electronic device.

3. The method of claim 1, wherein a portion of the audio input power to the speaker is dissipated as heat, wherein a portion of the heat propagates to and heats the surface of the electronic device.

4. The method of claim 1, wherein said limiting the audio input power to the speaker includes setting the audio input power so that said temperature at a later time approaches a temperature less than or equal to the previously determined target temperature when:
(i) a temperature of the surface of the electronic device is currently less than the previously determined target temperature; or
(ii) a temperature of the surface of the electronic device is currently greater than the target temperature.

5. The method of claim 1, wherein when a temperature of the surface of the electronic device is currently greater than the target temperature, maintaining the audio input power to the speaker at a level so that the surface of the electronic device at a later time approaches the previously determined target temperature by heat dissipation.

6. The method of claim 1, wherein said computing the power control signal is responsive to the predicted temperature of the surface of the electronic device.

7. The method of claim 1, further comprising:
estimating ambient temperature of the ambient of the electronic device; and
based on a discrepancy between a sensed temperature and a predicted temperature, updating a value of ambient temperature during a next sampling interval.

8. The method of claim 1, wherein said computing the power control signal is responsive to a transient time parameter which controls a rate of change of the temperature of the surface of the electronic device.

9. An adaptive control circuit configurable in an electronic device having a surface, the electronic device including: a speaker, a temperature sensor configured to sense a temperature internal to the electronic device, the adaptive control circuit comprising:
an audio input configured to receive an audio input signal responsive to an audio input power to the speaker;
a temperature sense input configured to receive a temperature signal responsive to the sensed internal temperature;
wherein responsive to the audio input signal and the temperature signal, a power control signal is computed by the adaptive control circuit so that a temperature of the surface of the electronic device at a later time approaches a previously determined target temperature;
a thermal model dynamics module configured to input a value proportional to the audio input power to the speaker and predict therefrom a temperature of the surface of the electronic device after a sampling time interval of sensing the temperature; and
an audio limiter configured to limit the audio input power to the speaker responsive to the power control signal.

10. The adaptive control circuit of claim 9, wherein a display of the electronic device is configured at least in part as a diaphragm of the speaker, wherein the display includes at least a portion of the surface of the electronic device.

11. The adaptive control circuit of claim 9, wherein a portion of the audio input to the speaker is dissipated as heat, wherein a portion of the heat propagates to and heats the surface of the electronic device.

12. The adaptive control circuit of claim 9, wherein the audio limiter is configured to set the audio input power so that said temperature at a later time approaches a temperature less than or equal to the previously determined target temperature when:
(i) a temperature of the surface of the electronic device is currently less than the previously determined target temperature; or
(ii) a temperature of the surface of the electronic device is currently greater than the target temperature.

13. The adaptive control circuit of claim 9, wherein when a temperature of the surface of the electronic device is currently greater than the target temperature maintaining the audio input power to the speaker at a level so that the surface of the electronic device at a later time approaches the target temperature by heat dissipation.

14. The adaptive control circuit of claim 9, further comprising:
a thermal protection module configured to compute an audio gain control signal responsive to a predicted temperature of the surface of the electronic device.

15. The adaptive control circuit of claim 9, further comprising:
an ambient temperature estimation module configured to estimate ambient temperature of the ambient of the electronic device, wherein based on a discrepancy between a sensed temperature and a predicted temperature, a value of ambient temperature is updated during a next sampling interval.

16. The adaptive control circuit of claim 9, wherein the audio gain control signal is computed responsive to a transient time parameter which controls a rate of change of the temperature of the surface of the electronic device.

17. An electronic device having an outer surface, the electronic device comprising:
a speaker;
an adaptive control circuit configured to receive an audio input signal responsive to an audio input power to the speaker;
a temperature sensor configured to sense a temperature internal to the electronic device, wherein a temperature signal responsive to the sensed temperature is input to the adaptive control circuit;
wherein responsive to the audio input signal and the temperature signal a power control signal is computed by the adaptive control circuit so that a temperature of the surface of the electronic device at a later time approaches a previously determined target temperature; and
an audio limiter configured to limit the audio input power to the speaker responsive to the power control signal, wherein responsive to the audio input power to the speaker, a temperature is predicted of the surface of the electronic device after a sampling time interval of said sensing the temperature.

18. The electronic device of claim 17, wherein the audio limiter is configured to set the audio input power so that said temperature at a later time approaches a temperature less than or equal to the previously determined target temperature when:
  (i) a temperature of the surface of the electronic device is currently less than the previously determined target temperature; or
  (ii) a temperature of the surface of the electronic device is currently greater than the target temperature.

19. The electronic device of claim 17, wherein the power control signal is computed responsive to the predicted temperature of the surface of the electronic device.

* * * * *